United States Patent [19]

Obenchain

[11] 4,327,241
[45] Apr. 27, 1982

[54] EXPLOSION VENTING MEANS FOR METALLURGICAL FURNACE

[76] Inventor: Richard F. Obenchain, 3340 Comanche Rd., Pittsburgh, Allegheny County, Pa. 15241

[21] Appl. No.: 199,617

[22] Filed: Oct. 22, 1980

[51] Int. Cl.³ ............................................. F27D 23/00
[52] U.S. Cl. .......................................... 373/9; 49/141; 52/1; 110/173 B; 432/64
[58] Field of Search ................. 13/1, 9 R; 110/173 B; 432/64, 65, 74; 266/144, 158, 159; 52/393, 573, DIG. 5, 1; 49/141

[56] References Cited

U.S. PATENT DOCUMENTS

| | | | |
|---|---|---|---|
| 3,807,106 | 4/1974 | Reinhardt | 52/1 X |
| 3,861,080 | 1/1975 | Schibli et al. | 52/1 X |
| 3,913,898 | 10/1975 | Wolters | 13/1 X |
| 4,027,436 | 6/1977 | Daly | 52/1 |
| 4,088,824 | 5/1978 | Bonistalli | 13/9 R |
| 4,160,117 | 7/1979 | Schempp | 13/1 |

Primary Examiner—Roy N. Envall, Jr.
Attorney, Agent, or Firm—Parmelee, Miller, Welsh & Kratz

[57] ABSTRACT

An explosion venting device for metallurgical furnace enclosures consists of a plurality of panels adapted for restrictive movement relative to the roof and sidewalls of the enclosure and cover openings therein. The panels absorb the shock blast of an explosion occurring within the housing by lifting outwardly from the housing walls. Being restrictively movably mounted, the blast force may be vented in any desired direction. When the explosive force ceases, the panels will return to their rest position against the housing.

11 Claims, 5 Drawing Figures

EXPLOSION VENTING MEANS FOR METALLURGICAL FURNACE

BACKGROUND OF THE INVENTION

During the operation of metallurgical furnaces, especially an electric arc furnace, there are ever present problems of noise, pollution and occasional explosions. The first two of these problems, noise and pollution, have been successfully controlled by an electric furnace station noise and smoke pollution control system. One such system is disclosed in U.S. Pat. No. 4,088,824, which patent is incorporated by reference herein. However, the third problem, explosions, is common in electric arc furnace operation and can disturb the continuity of the housing. Such explosions result from a number of uncontrollable conditions. Water or ice may be contained in scrap which is placed in the furnace vessel for charging. Additionally, the scrap may contain petroleum products or other combustible materials. Since the vessel may be at a high temperature and may have retained some molten metal from a previous operation, an explosion may occur, spewing forth flames and debris from the furnace. The danger of explosions is thus always present due to the nature and storage methods of the raw materials melted down in electric arc furnace operations. While the housing system referred to may contain the explosion within a restricted area, because of its present design, the housing is susceptible to severe damage from the force of those explosions.

It is therefore the purpose of this invention to offer an improvement to the housing which surrounds electric arc furnaces as well as other metallurgical vessels.

The explosion venting panels of the present invention protect the system housing from structural damage which an explosion could cause. The panels dissipate the force of the blast, such that it will be of minimal impact, away from men and equipment.

It is an object of this invention to enhance the capabilities of an electric furnace station noise and smoke pollution control system by providing it with explosion venting devices.

It is another object of this invention to provide an explosive venting device which is economical, simple to install and minimal in its maintenance requirements.

It is yet another object of this invention to vent explosive forces from a metallurgical vessel in a safe direction and, upon the completion of the explosion, return the vent means automatically to rest position.

It is a further object of this invention to selectively vent explosive forces from a metallurgical vessel along all four sides of venting panels in a direction parallel to the surface of the housing.

It is still another object of this invention to protect men and machinery from harm which is caused by explosions originating within a confined area such as a furnace housing.

SUMMARY OF THE INVENTION

The explosion venting device consists of a plurality of panels which are movably mounted on the framework of the enclosure of an electric arc furnace station pollution and noise control housing and enable the system housing shell to maintain its integrity while the panels are in a rest position against the skin of the housing. While in the rest position, the panels effectively seal the skin of the housing against the undesired entry of air into the station housing which, for example, could overburden the ventilation and pollution control systems of the station thus reducing the station's pollution control efficiency. In the rest or sealed position the venting panels prevent the release of uncontrolled pollutants and noise into the area surrounding the housing.

The station housing itself is comprised of a series of frame members which together form a skeletal structure which supports the various ducts, dampers, etc. related to air pollution control and the sheeting which forms the external skin of the housing.

The explosion venting panel may have trunnions extending from its sides. These trunnions are slidably engaged in brackets on the enclosure which permit the trunnion to slide in an outward and upward direction in relationship to the housing skin. This motion would be the result of an explosion within the housing. The brackets are mounted on the frame members of the housing and extend perpendicularly therefrom.

The explosion venting panels are positioned in a spaced relationship on all sides of the housing, beginning at a height comparable to the height of the parting line of the metallurgical vessel and vessel roof contained within the housing. These panels are also positioned on the roof of the housing. The explosive forces which radiate from the vessel may be in a horizontal direction between the vessel and the housing walls or in a vertical direction towards the roof of the housing.

Each venting panel may be supplied with several lifting lugs which permit the easy installation or removal of a selected panel by an overhead crane without disturbing adjacent panels. Additionally, it is possible to mount a motion restricting device, such as a chain connected from the panel to the housing frame, so as to control the angle and the distance of the outward movement of the venting panel.

The openings in the housing skin required with the present explosion venting device also provide a natural and excellent means for accommodating the thermally induced expansion and contraction indigenous to a housing constructed of sheeting, particularly a housing which encloses devices which generate tremendous levels of heat.

DESCRIPTION OF THE PREFERRED EMBODIMENT

Figure 1:
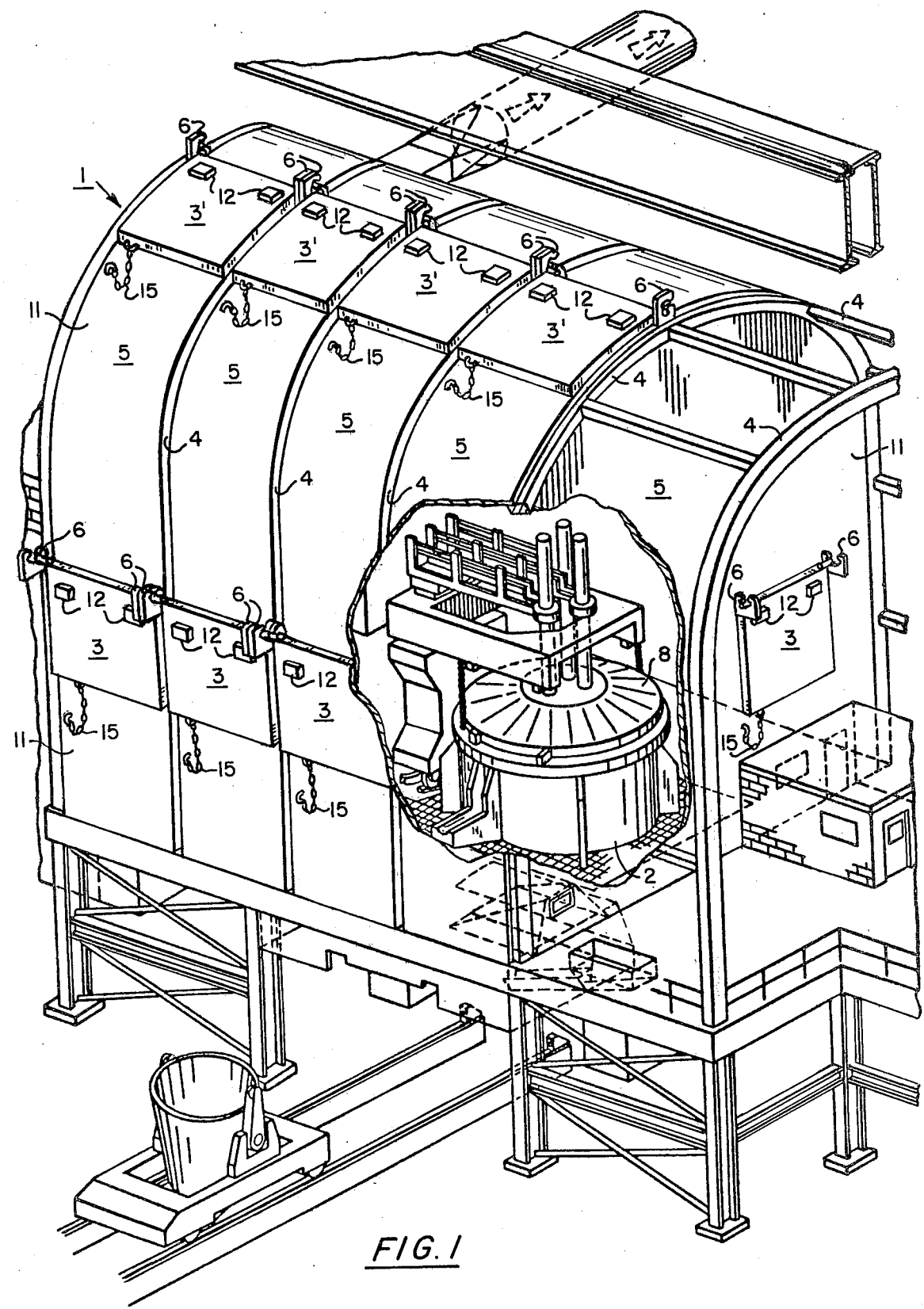
FIG. 1 schematically illustrates an electric furnace station noise and smoke pollution control system cut away to reveal a metallurgical vessel in a refining operation, and protected by a plurality of explosion venting devices.

Referring now to the drawings, there is schematically illustrated in FIG. 1 a pollution control housing 1 partially cut away to reveal an electric arc furnace 2, which is in the refining stage, mounted within the housing.

Additionally shown are a plurality of explosion venting devices mounted on the housing 1. Around the vertical surfaces of housing 1 are venting panels 3 and mounted atop the roof of the housing 1 are vent panels 3' which are distinguished for the sake of clarity during the description of explosive forces which can occur at various stages in the processing of materials within the station housing.

There are several possible methods by which the explosion venting panels 3 and 3' may be mounted on the station housing and yet the panels will continue to function within the spirit of the instant invention. While the preferred embodiment will be described in detail and several alternative embodiments will also be discussed, the exact manner in which a given venting panel is mounted on the housing will depend of that panel's location on the housing and the specific safety requirements of that location. Because of the location of the venting panel relative to equipment and work sites external to the housing it may be possible to allow the explosive force to dissipate along all four sides of the panel in a 360° pattern or it may be necessary to direct the force in a more limited direction up or down away from men and equipment. This can be achieved by restricting the motion of the panel or the manner in which it is mounted.

The station housing 1 includes a plurality of frame members 4 which form the skeletal support for the external sheeting 5 which encloses the station 1. Brackets 6 are fastened to frame members 4 and slidably support a plurality of roof venting panels 3' and side venting panels 3. The mounting assembly used for the venting panels is bracket 6 and trunnions 7, more clearly illustrated in FIGS. 2 and 3.

An explosion can originate in the metallurgical vessel 2. If the vessel roof 8 is in a closed condition, as illustrated in FIG. 1, the explosive blast will issue from between the vessel roof 8 and vessel 2 in a direction generally perpendicular to the sidewalls of housing 1 and strike the panels 3. The operation of the device at this juncture can be better understood in FIG. 2 which presents a lateral view of a venting panel.

Figure 2:
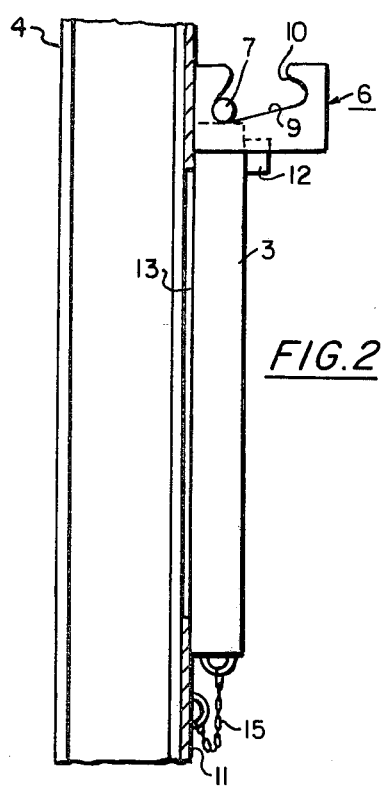
FIG. 2 schematically illustrates a lateral view of an explosion venting panel in a rest condition.

The venting panel 3 has at least one pair of trunnions 7 extending from opposed edges of the panel (only one being seen in this illustration). The trunnions 7 are slidably mounted in the brackets 6. The brackets 6 include an elevated slide 9 upon which the trunnions 7 are slidably mounted, and a retaining lug 10 which limits the movement of panel 3 and retains the panel 3 within bracket 6 during an explosion. The brackets 6 are shown secured to a frame member 4 of the housing 1 perpendicularly from the frame members 4 of the housing 1. Alternatively the venting panels may be mounted on brackets secured to the exterior surface of the housing. In FIG. 2 the panel 3 is in a rest condition against the system housing exterior wall 11 covering an opening in that wall of substantially the same size as but no larger than the venting panel 3. Also mounted on the panel 3 are the lifting lugs 12 which permit the use of overhead cranes and similar devices in the installation onto, and the removal from, the brackets 6 without disturbing any adjacent panels.

The horizontally directed force of the explosion will strike the inner face 13 of the venting panel 3. The panel 3 will absorb some of the energy of the blast and will slide upwardly and outwardly from the exterior surface 11 of the housing 1. The elevated slide 9 is angled to permit the trunnion 7 to lift the venting panel 3 up and away from the housing wall 1. Preferably, movement of the panels will be initiated by a force of not less than 5 pounds per square inch on the panel. The panel 3 will terminate its upward movement when the trunnions 7 abut the retaining lugs 10. The movement will also terminate if the blast force should cease or be dissipated prior to the abutment of the trunnion 7 with the retaining lug 10.

Figure 3:
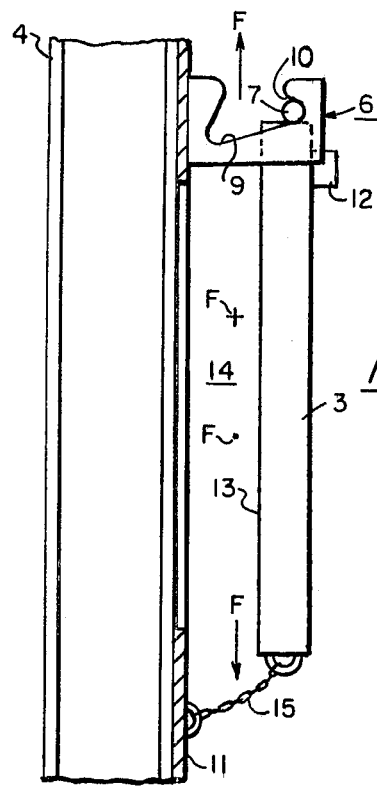
FIG. 3 schematically illustrates a lateral view of an explosion venting panel in a dynamic condition due to an explosion within the housing station.

FIG. 3 illustrates the dynamic condition of the venting panel 3 during an explosion. Here the panel 3 is driven on the trunnions 7 to the extreme of the elevated slide 9 into abutment with the retaining lug 10. This condition creates an open channel 14 between the inner face 13 of the panel 3 and the surface sheeting 11 of the housing 1. The blast is vented from within the housing 1 through the channel 14 which reduces the blast force so that the force radiates in a 360° pattern along the surface 11 of the housing 1.

The force vectors "F" indicate the changed direction in which the blast force is safely vented from within the housing 1. The blast force "F" is generally parallel with the surface 11, and radiates from both the horizontal and vertical edges of the panel 3. Once the explosive force has been safely dissipated, the panel 3, by the force of its own weight, will ride down the elevated slide 9 and come to rest against the housing's external sheeting 5. This will close the channel 14 and reseal the opening in the housing and permit the pollution control station to function in an effective manner.

In the event of an explosion within the vessel mounted inside the housing 1, the thrust of the blast force will be determined primarily by the position of the vessel roof 8 at the time of the explosion. If, for example, the vessel roof 8 is lifted clear and positioned to the side of the vessel 2, the blast force will radiate in an upward direction from the vessel 2 towards the roof of the station housing 1. The explosion venting panels 3' mounted over openings in the roof will be able to absorb the force and vent the expanding gases by sliding up and away from the skin of the roof. The blast force will be redirected perpendicularly from the surface of the panel 3' in a full 360° pattern along the skin of the housing.

Figure 4:
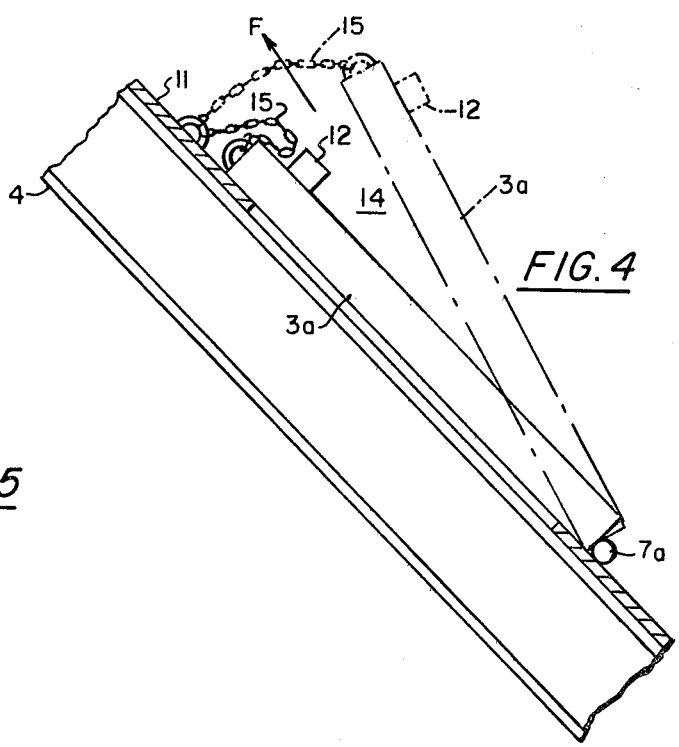
FIG. 4 schematically illustrates a lateral view of an explosion venting panel in an alternative embodiment, and FIG. 5 schematically illustrates an explosion venting panel of a second alternative embodiment at a rest condition, and in dash-dot lines, a dynamic condition.

An alternative embodiment of the explosion venting panel which is illustrated in FIG. 4 and indicated by the reference character 3a may be preferably used on the non-vertical surfaces of the station house. A pair of trunnions or trunnion-like devices extend from opposite sides of the panel 3a adjacent a common edge and are mounted to the frame members 4 to allow pivotal movement therebetween. A chain or the like, as at 15, limits the pivotal swing of the panel away from the surface of the housing while at the same instant permitting the formation of a channel 14 through which an explosive force "F" may be dissipated. The dynamic position of the panel is shown in dash dot lines. Because the trunnions 7a provide a fixed pivot point for the panel, the panel will automatically return to its preexplosion rest position by the force of its own mass.

Figure 5:
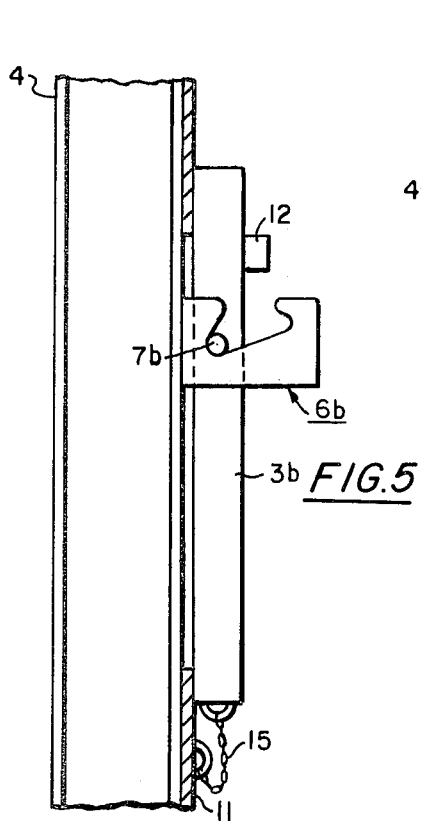

An alternative embodiment of the explosion venting device employing the trunnion and bracket assembly is illustrated in FIG. 5. As shown, vent panel 3b is slidably mounted on brackets 6b by means of trunnions 7b. The principal difference between this embodiment and the preferred embodiment is the location of the brackets and trunnions. In this alternate embodiment, the brackets 6b and the trunnions 7b are mounted about one-third to one-half of the way down from the upper edge of the panel 3a. In all respects the venting panel 3b will function similarly to the panels 3 and 3' shown in FIGS. 1 through 4.

Additionally, the venting device need not be limited to only two bracket-trunnion assemblies per panel. The venting panel could easily have four such assemblies configured to control the upward and outward motion of the panels at both the upper and lower edges of the device. The distance which the panel travels away from the housing can be controlled by the manipulation of the angle and length of the elevated slide 9 of the bracket 6. Another method of controlling the travel of the panel would be the installation of a limiting device such as a length of chain 15 which is connected at one end to the panel 3 and at the other end to a housing frame member 4. This device restricts the size of the open channel 14 or causes the panel 3 to open at an angle, further manipulating the direction of the explosive blast. The chain 15 is removably attached by a hook and eye system or the like in order that the panel 3 be easily installed or removed from the housing 1.

The explosion venting device described herein adds a simple yet valuable margin of safety to housings used to enclose metallurgical vessel which present explosion hazzards during operation.

What is claimed is:

1. In a metallurgical furnace station enclosure wherein a housing is provided formed from frame members which support a series of panels, the housing enclosing the furnace during charging, melting, refining and tapping, the improvement wherein:
   a plurality of said panels are constructed as explosion venting panels adapted for restrictive movement relative to the frame members of the housing, said venting panels movable from a closed position during normal operation of the furnace to a restricted open position upon explosive forces being exerted from within the enclosure.

2. In a metallurgical furnace station enclosure as defined in claim 1, the improvement wherein said venting panels return to the closed position by the force of their own mass upon the dissipation of the explosive force from within the enclosure.

3. In a metallurgical furnace station enclosure as defined in claim 2 the improvement wherein the restricted open position of the venting panels dissipates the explosive force in a predetermined direction.

4. In a metallurgical furnace station enclosure as defined in claim 3, the improvement wherein said venting panels are adapted for restrictive movement upon the exertion of an explosive force from within the enclosure of not less than 5 pounds per square inch on said panels.

5. In a metallurgical furnace station enclosure as defined in claim 4, the improvement wherein said venting panels are mounted in a spaced relationship about the housing.

6. In a metallurgical furnace station enclosure as defined in claim 2, the improvement wherein said venting panels are adapted for restrictive movement relative to the frame members of the housing by means of brackets mounted on and extending out from the frame members, said brackets forming an elevated slide upon which said venting panel is movably mounted by means of trunnions extending from the sides of said venting panel and movably seated on said elevated slides so that said venting panel remains in a closed position, sealing the enclosure during normal operations but rides up and away from the enclosure upon an explosive force being exerted from within the enclosure, and upon termination of the explosive force said venting panel slides down towards the housing and return to a closed rest position.

7. In a metallurgical furnace station enclosure as defined in claim 6, the imporvement wherein said brackets include an elevated slide upon which said venting panel trunnions are movably seated, said elevated slide being angled so than said venting panel slides up and away from the housing providing an opening in the surface of the housing through which explosive forces may be vented, and a retaining lug positioned at the end of the elevated slide opposite the end of the brackets secured to the frame member, so as to restrict the movement of the venting panels.

8. In a metallurgical furnace station enclosure as defined in claim 2, the improvement wherein said venting panels are adapted for restrictive movement relative to the frame member of the housing by a pivoting means mounted along opposite sides of said panel adjacent a common edge thereof and engaging said frame members such that said panel swings out away from the enclosure upon an explosive force being exerted from within the enclosure, and upon termination of the explosive force said venting panel pivots to a closed rest position.

9. In a metallurgical furnace station enclosure as defined in claims 7 or 8, the improvement wherein said venting panels are adapted for restrictive movement relative to the frame members of the housing by means of chains attached to one end to the frame member and at the other end to said venting panels in order to restrict the outward motion of said venting panel upon explosive forces exerted from within the enclosure.

10. In a metallurgical furnace station enclosure as defined in claim 9, the improvement wherein said venting panels have lifting lugs extending therefrom for use in mounting and removing said venting panels.

11. In a metallurgical furnace station enclosure wherein a housing is provided formed from frame members which support a series of panels, the housing enclosing the furnace during charging, melting, refining and tapping, the improvement wherein a plurality of said panels comprise explosion venting devices adapted for restrictive movement relative to the frame members of the housing, said venting devices comprising:
   a venting panel which maintains the integrity of the surface area and furnace enclosure when in a rest condition;
   at least two trunnions extending from the sides of said venting panel; and
   at least two brackets mounted on and extending out from the frame members of the housing, said brackets supporting said trunnions on an angled surface so that in the event of an explosive force being exerted from within the housing, said venting panel moves up and out away from the housing enclosure providing a vent through which explosive forces escape the enclosure and upon dissipation of the explosive force said vent panel returns to a closed rest position against the enclosure because of the angled surface of the bracket upon which the trunnions are slidably mounted.

* * * * *